US009454306B2

(12) United States Patent
Newby, Jr. et al.

(10) Patent No.: US 9,454,306 B2
(45) Date of Patent: Sep. 27, 2016

(54) CAPTURING DEMAND ON STORAGE CAPACITY AND PERFORMANCE CAPABILITY

(71) Applicant: NetApp, Inc., Sunnyvale, CA (US)

(72) Inventors: Lewis R. Newby, Jr., Greeley, CO (US); Kelly Hemphill, Research Triangle Park, NC (US)

(73) Assignee: NETAPP, INC., Sunnyvale, CA (US)

(*) Notice: Subject to any disclaimer, the term of this patent is extended or adjusted under 35 U.S.C. 154(b) by 116 days.

(21) Appl. No.: 14/488,003

(22) Filed: Sep. 16, 2014

(65) Prior Publication Data

US 2016/0077741 A1 Mar. 17, 2016

(51) Int. Cl.
G06F 12/00 (2006.01)
G06F 13/00 (2006.01)
G06F 13/28 (2006.01)
G06F 3/06 (2006.01)
G06F 17/30 (2006.01)
H04L 12/24 (2006.01)
H04L 12/26 (2006.01)

(52) U.S. Cl.
CPC .......... G06F 3/0604 (2013.01); G06F 3/0631 (2013.01); G06F 3/0647 (2013.01); G06F 3/0685 (2013.01); G06F 3/0605 (2013.01); G06F 3/067 (2013.01); G06F 3/0613 (2013.01); G06F 3/0665 (2013.01); G06F 17/3053 (2013.01); H04L 41/0896 (2013.01); H04L 41/142 (2013.01); H04L 41/5003 (2013.01); H04L 43/0888 (2013.01)

(58) Field of Classification Search
None
See application file for complete search history.

(56) References Cited

U.S. PATENT DOCUMENTS

2014/0130055 A1* 5/2014 Guha ................... G06F 3/0604
718/104
2014/0201218 A1* 7/2014 Catalano ................. G06F 8/60
707/748

* cited by examiner

Primary Examiner — Jared Rutz
Assistant Examiner — Marwan Ayash
(74) Attorney, Agent, or Firm — Klein, O'Neill & Singh, LLP

(57) ABSTRACT

Workload on an aggregation of storage devices can be quantified in terms of demand on the aggregation of storage devices and demand on logical storage containers configured on the aggregation of storage devices. The demand on the aggregation of storage devices and the demand on logical storage containers thereon are calculated in a manner that captures demand on both storage capacity and performance capability. Capturing demand on both storage capacity and performance capability facilitates intelligent management that accounts for the relationship between storage capacity and performance capability. This allows the owner/operator of the storage equipment to use storage capacity at a desired (or requested) performance.

18 Claims, 5 Drawing Sheets

CAPTURING DEMAND ON STORAGE CAPACITY AND PERFORMANCE CAPABILITY

BACKGROUND

This disclosure generally relates to the field of computing, and, more particularly, to storage analysis.

Entities that manage large amounts of data use increasing storage density, in terms of number of storage devices and capacity of storage devices, to satisfy their needs. These entities often employ storage solutions that aggregate subsets of these large storage devices for various reasons, including management of the storage devices and data thereon. In addition, administrators of the storage solutions configure logical data containers (e.g., volumes) on the aggregates of storage devices.

BRIEF DESCRIPTION OF THE DRAWINGS

The disclosure may be better understood by referencing the accompanying drawings.

DESCRIPTION OF EXAMPLE ILLUSTRATION(S)

Figure 1:
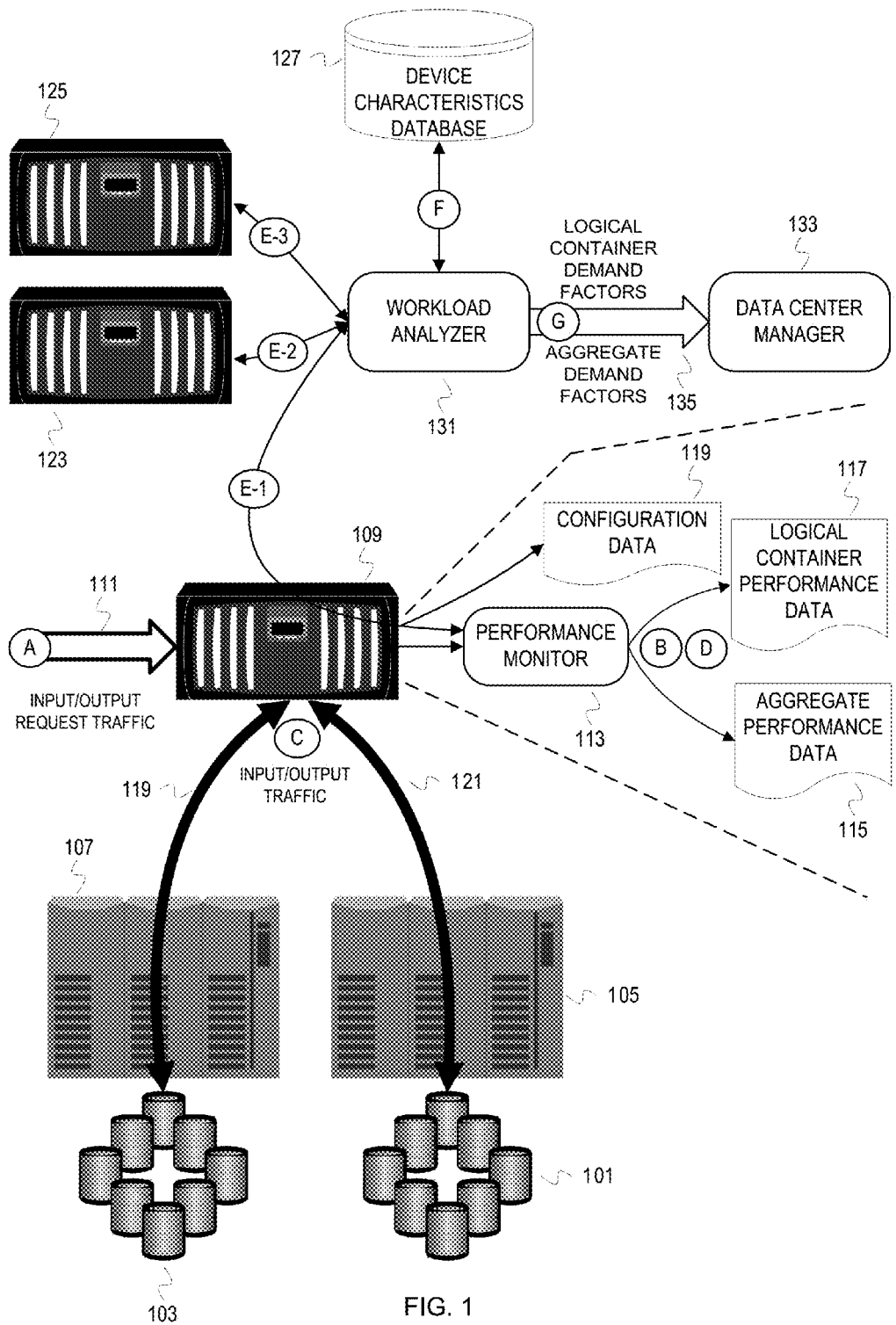
FIG. 1 depicts an example storage environment that determines demand factors used for managing the storage environment.

The description that follows includes example systems, methods, techniques, instruction sequences and computer program products that embody techniques of the inventive subject matter. However, it is understood that the described embodiments may be practiced without these specific details. In other instances, well-known instruction instances, protocols, structures and techniques have not been shown in detail in order not to obfuscate the description.

Introduction

A storage environment or storage system can include a variety of equipment, including network equipment and storage equipment. The role of storage equipment depends upon its hardware configuration and/or software configuration. Storage equipment that includes storage space (e.g., an array of drives) is referred to herein as a storage device. Storage equipment that manages access to storage space (e.g., a server, filer, storage controller) is referred to herein as a storage manager.

One aspect of managing access to storage space includes handling input/output (I/O) requests or commands for I/O operations, such as reads and writes. Excepting data caching at a storage manager, a storage manager sends I/O requests to the appropriate storage device and that storage device performs the requested operation. The storage device provides a response for the request to the storage manager. And the storage manager conveys the response to a requestor that corresponds to the I/O request.

The requestor is often an application instance running on a machine. A requestor may be running on a different machine than the storage manager, or the requestor may be running on the storage manager. The I/O requests and the corresponding I/O operations are generally referred to as workload. The I/O requests that traverse a storage manager are referred to herein as the workload on the storage manager. The I/O operations performed on a storage device are referred to herein as workload on the storage device. Since I/O requests and the corresponding I/O responses traverse a storage manager, a storage manager has visibility of data that can be used to decompose a workload based on various criteria into multiple workloads. A storage manager also has visibility of data that can be used to determine performance data with respect to workloads.

Overview

Increasing density of storage capacity allows for storage of large amounts of data. However, the performance capability for these denser storage devices has not increased in proportion. While a large amount of storage space may be available per storage device, the latency in accessing that large space can significantly impact performance. In addition, storage equipment in data centers is often upgraded incrementally. This leads to a data center having storage equipment of varying configurations in terms of both storage capacity and performance capability.

The imbalance between storage capacity and performance capability along with non-uniform storage equipment often leads to operational issues. With the addition of diverse workloads, the cause of operational issues cannot be easily ascertained. To help resolve operational issues, workload on an aggregation of storage devices (referred to herein as an "aggregate") can be quantified in terms of demand on the aggregate and demand on logical storage containers configured on the aggregate. The demand on the aggregate and the demand on logical storage containers thereon are calculated in a manner that captures demand on both storage capacity and performance capability. Capturing demand on both storage capacity and performance capability facilitates intelligent management that accounts for the relationship between storage capacity and performance capability. This allows the owner/operator of the storage equipment to use storage capacity at a desired (or requested) performance. An aggregate with high demand can be identified, and then the demand on logical storage containers configured on the high demand aggregate can be identified. Determining demand on logical storage containers provides guidance in managing workloads because a workload typically accesses a same set of one or more logical storage containers. The logical storage containers can then be managed across storage devices based on the determined demand. Furthermore, cumulative effects of workloads can be identified and addressed.

Example Illustrations

FIG. 1 depicts an example storage environment that determines demand factors used for managing the storage environment. The example storage environment includes a storage manager 109 that manages access to an aggregate 107 and an aggregate 105. As mentioned in the introduction, the aggregates may be arrays of drives (e.g., a redundant array of independent disks (RAID), an array of solid state drives, a mixture of drives). FIG. 1 depicts logical storage containers 101 configured on the aggregate 105 and logical storage containers 103 configured on the aggregate 107. The example storage environment also includes storage managers 123, 125. This illustration does not depict the aggregates managed by the storage managers 123, 125 to avoid overcomplicating the example illustration. The storage environment also includes a workload analyzer 131 and a data center manager 133. FIG. 1 also depicts a device characteristics database 127 in the illustrated example environment.

FIG. 1 depicts example operation of the illustrated storage environment with sequential stages. The depicted sequential stages are provided to aid in understanding this disclosure and should not be used to limit scope of the claims. In addition, the depicted stages can overlap and encompass activity that occurs continuously and is not necessarily discrete activities.

In this illustrated environment, I/O requests are sent to the storage manager 109 (stage A). An arrow 111 represents the I/O request traffic sent to the storage manager 109 over time. The I/O requests can flow through intermediate storage equipment (e.g., a cluster manager, load balancer, etc.) before arriving at the storage manager 109. The storage manager 109 hosts a performance monitor 113.

The performance monitor 113 maintains performance data 115 for the aggregates managed by the storage manager 109 and performance data 117 for the logical storage containers on those aggregates. This performance data is maintained in accordance with specified time periods, for example indicated in configuration data. The aggregate performance data 117 includes data about the amount of data transferred to the aggregates and from the aggregates, which indicates the amount of data written to and read from the aggregates. The aggregate performance data 115 also includes data that indicates an amount of time drives of the aggregates are busy performing requested operations. The logical storage container performance data 115 includes throughput data per logical storage container, consumed/used storage capacity per logical storage container, and latency data per logical storage container. The storage manager 109 also hosts configuration data 119. The configuration data 119 indicates number of drives that constitute each aggregate and an amount of physical access mechanisms (e.g., spindle in a hard disk drive, read/write heads in a hard disk drive, memory controller for each solid state drive, etc.). The performance monitor 113 updates the performance data 115, 117 based on the I/O requests that flow through the storage manager 109 (stage B).

The I/O requests continue on to the targets within the aggregates 105, 107 and responses flow back from the aggregates 105, 107 (stage C). The arrow 119 represents the flow of I/O requests to the aggregate 107 and flow of responses from the aggregate 107. Similarly, the arrow 121 represents the flow of I/O requests to the aggregate 105 and responses from the aggregate 105. At one level of storage virtualization, these I/O requests target logical storage containers and storage objects within those logical storage containers. But these I/O requests eventually are translated, for instance in the storage manager 109, into I/O requests that target particular blocks or regions of physical storage identified by physical addresses. The drives of the aggregates 105, 107 service these lower level requests. The drive hardware performs the requested reads or writes to the physical addresses that correspond to logical objects within logical storage containers. The performance monitor 113 updates the performance data 115, 117 based on the responses that flow back from the aggregates 105, 107 (stage D).

At some point, the workload analyzer 131 requests data from the storage managers 109, 123, 125; and the storage managers provide the requested data (states E-1 to E-3). Although the storage managers 109, 123, 125 may monitor performance in accordance with different configured time intervals, the workload analyzer 131 requests data from a same window of time across the storage managers to avoid time based variations in the operational environment. For instance, a failure in network equipment can impact performance data in one time window but not another time window.

The workload analyzer 131 also obtains data about characteristics of the storage devices in the aggregates (stage F). The workload analyzer 131 accesses the database 127 to obtain data about the performance capabilities of the storage devices, such as I/O operations per second ("IOpS"). The characteristics data is provided by manufacturers of the storage devices. The characteristics data can also indicate total raw space.

With the collected data, the workload analyzer 131 computes demand factors and supplies those to the data center manager 133 (stage G). An arrow 135 represents all of the computed demand factors being sent to the data center manager 133. The workload analyzer 131 may have been previously notified of which storage managers or aggregates were to be analyzed. The workload analyzer 131 can then compute demand factors for all of those aggregates and the logical storage containers on the aggregates. In some cases, the workload analyzer 131 collects data about logical storage containers based on the demand factors computed for the aggregates.

After receiving the demand factors, the data center manager 133 can request additional data from the workload analyzer 131 and then eventually initiate management actions. The data center manager 133 can migrate high demand logical storage containers from a high demand aggregate to a low demand aggregate. The data center manager 133 can request demand factors at specified intervals over a specified time period. The data center manager 133 can then use the demand factors to identify workloads that are complementary, and migrate corresponding logical storage containers accordingly. The data center manager 133 can also generate recommendations for an administrator based on the demand factors.

As already stated, numerous variations in storage environment configurations are possible. In addition, the storage environments can operate in different manners depending upon configurations. The illustration does not depict modules (131, 133) as instantiated on any particular equipment of the storage system since the modules can be deployed in a number of ways. As an example, the workload analyzer 131 and the data center manager 133 can be instantiated on storage equipment that manages the storage environment. Either one of the modules can have components distributed throughout the storage environment. The information represented by this database 127 can be maintained separately from the storage environment, distributed throughout the storage environment, etc.

Figure 2:
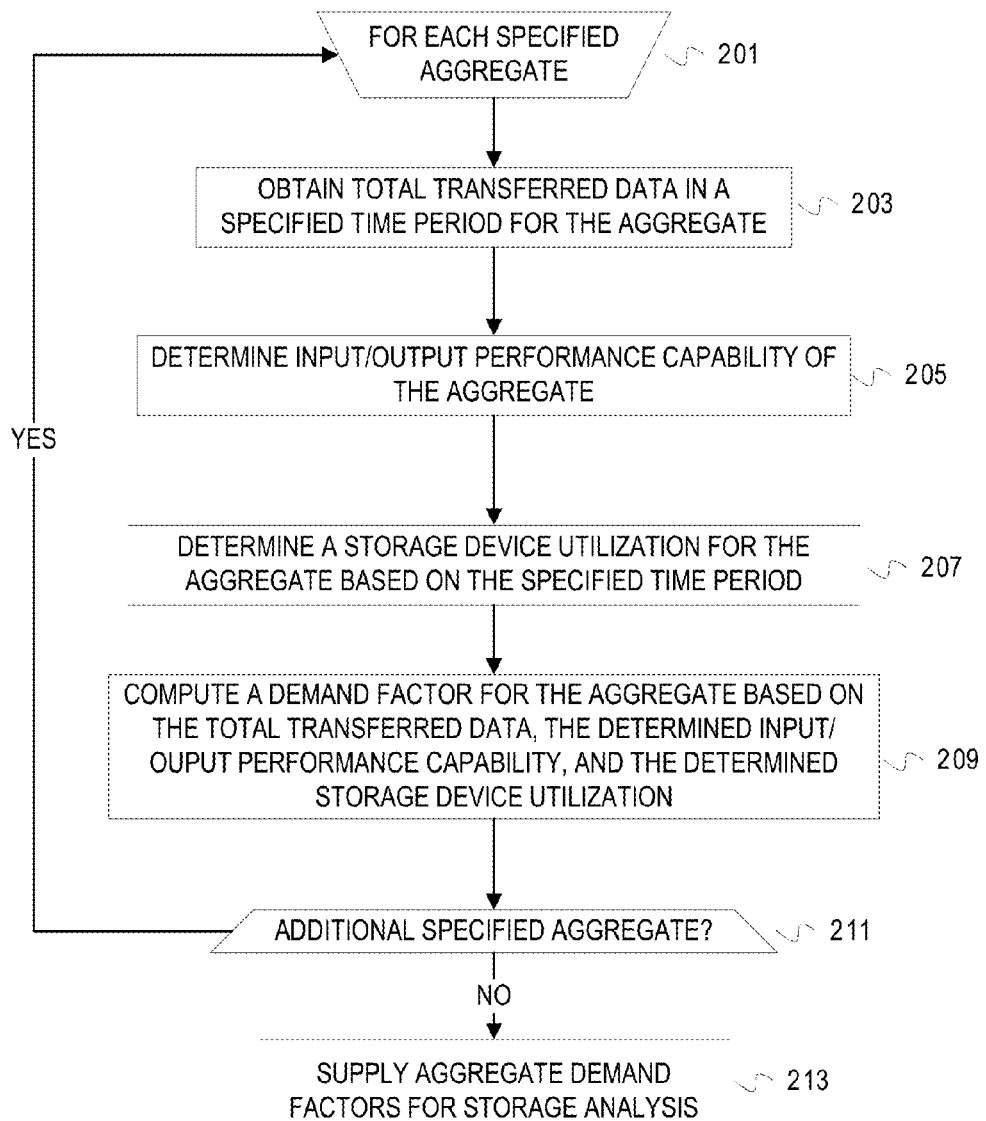
FIG. 2 depicts a flowchart of example operations for computing aggregate demand factors.

FIG. 2 depicts a flowchart of example operations for computing aggregate demand factors. A workload analyzer can receive as input one or more specified aggregates for which demand factors should be determined. The aggregates can be specified in a user interface, in a configuration file, in a dynamically generated list of aggregates, etc. A list of aggregates can be dynamically generated by specifying different sets of aggregates in a storage environment across a rolling window. A monitor of a storage environment can specify an aggregate that generates an alarm indicating a performance issue and other aggregates as potential destinations for migration actions.

At block 201, a workload analyzer begins to iterate over each specified aggregate.

At block 203, the workload analyzer obtains total transferred data in a specified time period for the aggregate. The total transferred data for an aggregate indicates the total amount of data that has been read from the aggregate and written to the aggregate within the specified time period. For example, the workload analyzer requests data that indicates the total number of bytes read from and written to the aggregate within a 30 minute time window.

At block 205, the workload analyzer determines I/O performance capability of the aggregate. Since the aggregate is an aggregate of storage devices, the I/O performance capability of the aggregate is aggregate I/O performance capability of the constituent storage devices. If the constituent storage devices are homogenous, then the I/O performance capability is the I/O performance capability of any one of the storage devices multiplied by the number of access mechanisms. For example, performance capability can be measures with IOpS. The IOpS for an aggregate of hard disk drives can be computed as a product of a number of spindles in the aggregate and the IOpS for each spindle. As another example, the performance capability of an aggregate of solid state drives can be computed as a product of a number of memory controllers in the aggregate and the IOpS for each memory controller. If an aggregate is a hybrid of storage device types, then the aggregate IOpS would be computed as a sum of the products of number of access mechanism and IOpS for each storage device type. A workload analyzer may obtain configuration data, such as number of access mechanisms and specified I/O performance capability for each type of storage device, from a storage manager or manufacturer's database.

At block 207, the workload analyzer determines storage device utilization for the aggregate based on the time period. Storage device utilization indicates utilization of storage devices of the aggregate. The workload analyzer can determine storage device utilization based on busy time of storage devices in an aggregate. The busy time for a storage device indicates an amount of the specified time period (e.g., a percentage or seconds) that the storage device was busy performing I/O operations (e.g., reading or writing). The workload analyzer computes a value that represents storage device utilization. The storage device utilization value can be computed as a quotient of a sum of the busy time for constituent storage devices within the specified time period and the total number of storage devices.

At block 209, the workload analyzer computes a demand factor for the aggregate based on the total transferred data, the determined aggregate I/O performance capability, and the determined storage device utilization. The workload analyzer computes the aggregate demand factor as a product of the storage device utilization and a quotient of the total transferred data and the aggregate I/O performance capability. This can be expressed in an equation as follows:

$$ADF = \left(\frac{Aggr\_TT}{Aggr\_IO}\right) * Device\_Utilization$$

where ADF represents the aggregate demand factor, Aggr_TT represents the total transferred data for an aggregate, Aggr_IO represents the I/O performance capability of an aggregate, and Device_Utilization represents storage device utilization. The computation may also incorporate calculations to normalize these values (e.g., adjusting kilobits and gigabytes to bytes).

At block 211, the workload analyzer determines whether there is an additional specified aggregate. If there is an additional specified aggregate, then control flows to block 201. If not, then control flows to block 213.

At block 213, the workload analyzer supplies the aggregate demand factors for storage analysis. The aggregate demand factors can be used to identify high demand aggregates.

Figure 3:
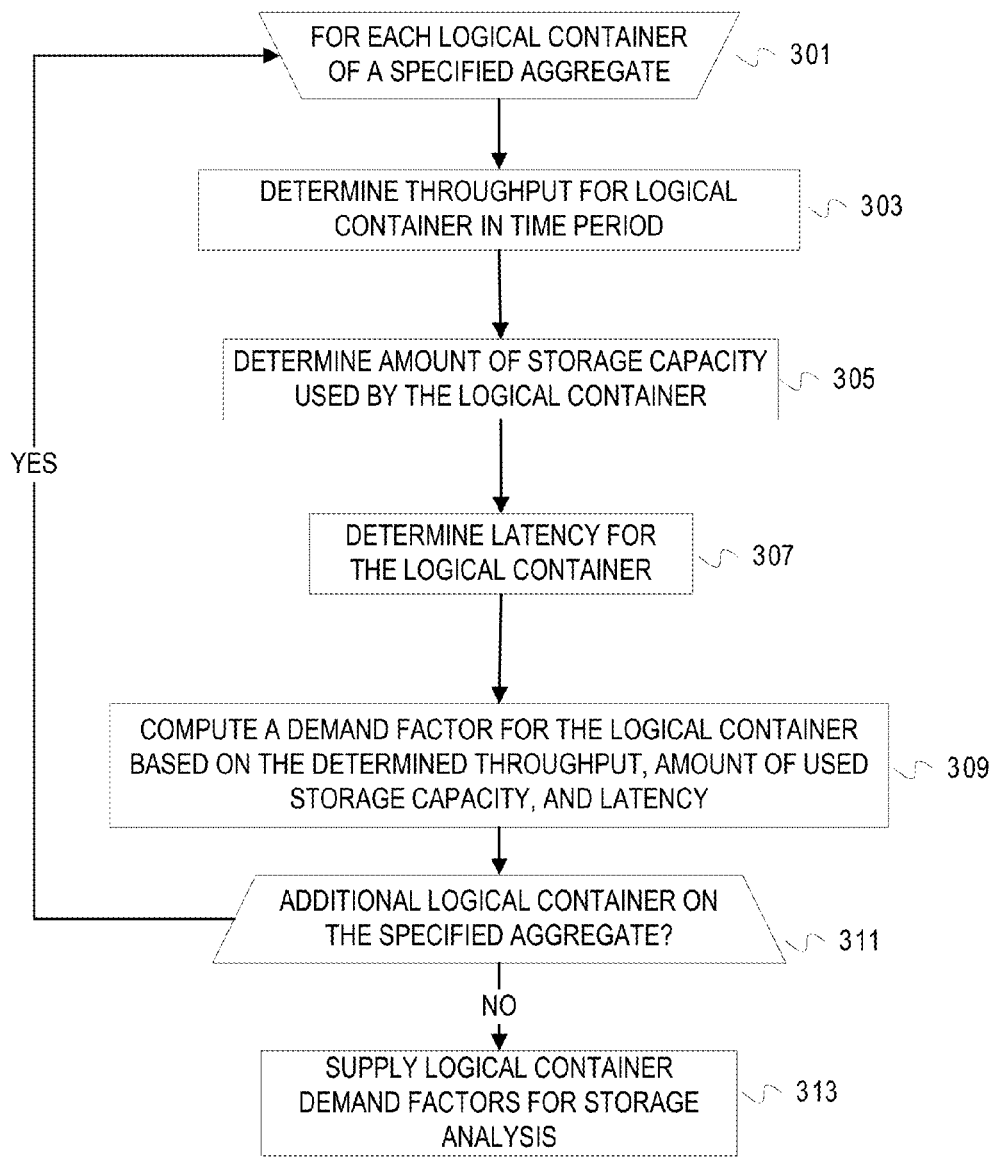
FIG. 3 depicts a flowchart of example operations for computing logical storage container demand factors for specified aggregates.

With the demand factors for specified aggregates, a workload analyzer can then compute demand factors for logical storage containers on the specified aggregates. FIG. 3 depicts a flowchart of example operations for computing logical storage container demand factors for specified aggregates.

At block 301, a workload analyzer begins to iterate over logical storage containers of each specified aggregate. The specified aggregates may be the same specified aggregates for which demand factors were already computed. Or the specified aggregates may be a subset of those specified previously.

At block 303, the workload analyzer determines throughput for the logical storage container. The workload analyzer obtains the performance data that indicates throughput for the logical storage container from the corresponding storage manager. This performance data is obtained based on the time period used for computing the demand factor of the aggregate that hosts the logical storage container. The throughput can be measured within smaller intervals of the time period. For instance, a performance monitor may average the amount of data transferred per second every 10 seconds. The workload analyzer can then determine the throughput as the average of the reported throughput over a 30 minute time period. The workload analyzer may convert the metrics of the throughput before computing the logical storage container demand factor or during that computation.

At block 305, the workload analyzer determines storage capacity used by the logical storage container. The storage capacity used by the logical storage container can vary over time. Therefore, the workload analyzer may determine an average of the used storage capacity during the time period used for the aggregate demand factors. The workload analyzer can be configured to use the amount of storage capacity used by the logical storage container at a particular time instant. As examples, the used storage capacity may be peak used storage capacity during the time period or the storage capacity used at the beginning or end of the time period.

At block 307, the workload analyzer determines latency of the logical storage container. The workload analyzer can obtain this performance data from the corresponding storage manager as it iterates over each logical storage container or obtain data that indicates performance for all of the logical storage containers of the specified aggregate. The latency performance data indicates time lapse from receiving an I/O request that targets the logical storage container to receipt by the storage manager of the corresponding I/O response. The latency value used for computing the demand factor on the logical storage container is an average of latencies across the time period of the aggregate demand factor.

At block 309, the workload analyzer computes a demand factor for the logical storage container based on the determined throughput, the amount of used storage capacity, and the determined latency. The workload analyzer computes the logical storage container demand factor as a product of logical storage container latency and a quotient of logical storage container throughput and used storage capacity. This can be expressed in an equation as follows:

$$LCDF = \left(\frac{LC\_TP}{LC\_Used}\right) * Latency,$$

where LCDF represents the logical storage container demand factor, LC_TP represents the determined logical storage container throughput, LC_Used represents the amount of storage capacity used by the logical storage container, and Latency represents the average latency of the logical storage container during the time period. As with the ADF, computing the LCDF can also include calculations to convert certain input values to a same metric (e.g., converting throughput from kilobytes per millisecond to bytes per second).

At block 311, the workload analyzer determines whether there is an additional logical storage container in the specified aggregate. If there is an additional logical storage container, then control flows to block 301. If not, then control flows to block 313.

At block 313, the workload analyzer supplies the logical storage container demand factors for storage analysis. The aggregate demand factors can be used to identify high demand logical storage containers, which can then be used to differentiate workloads.

Figure 4:
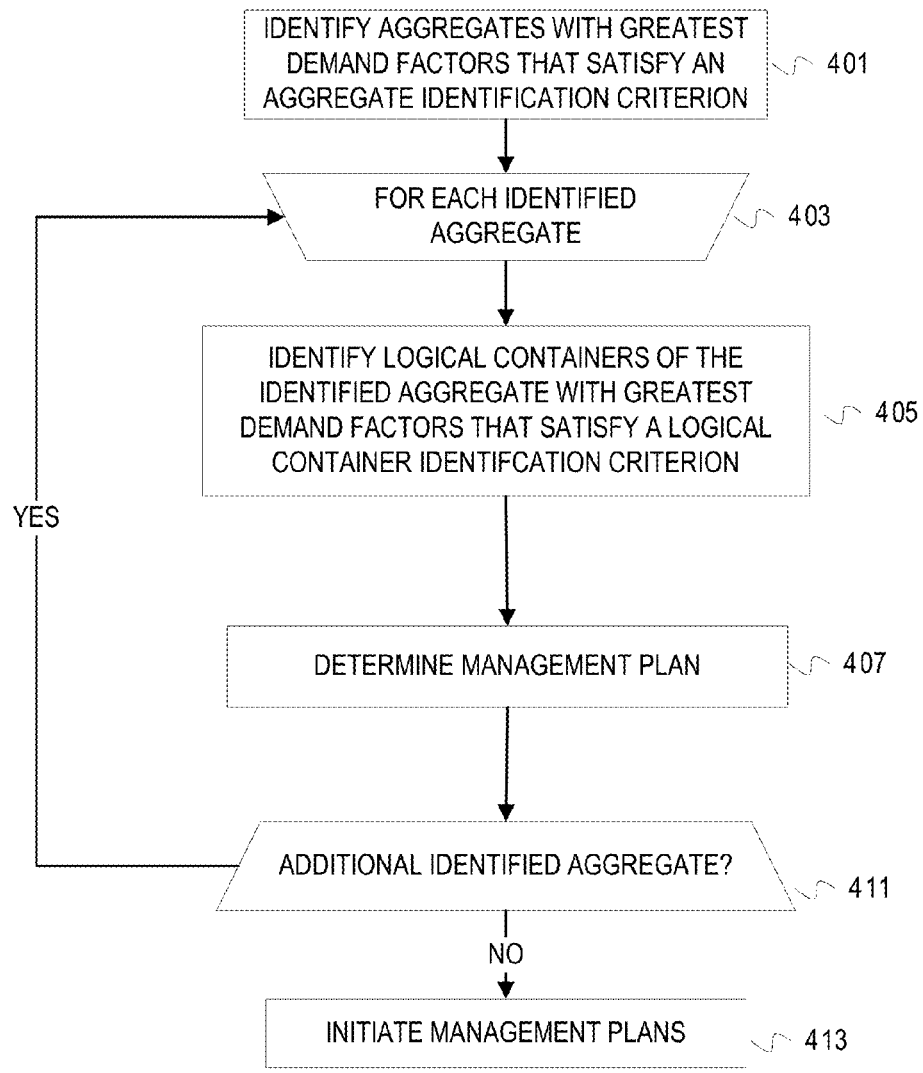
FIG. 4 depicts a flowchart of example operations for determining high demand logical storage containers and then initiating management plans accordingly.

As mentioned in FIGS. 2 and 3, the aggregate demand factors can be used to determine which aggregates will be selected for computing demand factors of logical storage containers thereon. FIG. 4 depicts a flowchart of example operations for determining high demand logical storage containers and then initiating management plans accordingly.

At block 401, a module (e.g., a workload analyzer or environment manager) identifies aggregates with the greatest demand factors that satisfy an aggregate identification criterion. For example, the module can identify the n highest demand aggregates based on aggregate demand factors. As another example, the identification criterion may be a threshold aggregate demand factor. Thus, the module can identify all of the aggregates with aggregate demand factors that exceed a threshold demand factor. The module can also identify the n highest demand aggregates with demand factors that exceed an aggregate demand factor threshold.

At block 403, the module begins to iterate over each of the identified aggregates.

At block 405, the module identifies the logical storage containers of the identified aggregate with the greatest demand factors that satisfy a logical storage container identification criterion. The logical storage container identification criterion can indicate any one of a number of logical storage containers, a logical storage container demand factor threshold, a combination of a threshold and number of logical storage containers, etc.

At block 407, the module determines a management plan. Based on the computed demand factors of the identified logical storage containers, a management plan can be created or selected that alleviates the demand on the aggregate that hosts the identified logical storage containers. For example, the highest demand logical storage containers can be migrated to a lowest demand aggregate that satisfies any requirements of the workloads that target the high demand logical storage containers. The lowest demand aggregate can be identified with the previously computed aggregate demand factors. As another example, reporting mechanisms (e.g., alarms) can be adjusted to be more sensitive to performance changes of the high demand logical storage containers. A management plan can also be generated that indicates hardware adjustments to alleviate the demand on the aggregate supporting the high demand logical storage containers. For instance, the management plan can indicate that a greater number of drives or spindles should be added to the aggregate of the high demand logical storage containers. The management plan can also be an indication of the high demand logical storage containers to be further analyzed.

At block 411, the module determines whether there is an additional identified aggregate. If there is an additional identified aggregate, then control flows to block 403. Otherwise, control flows to block 413.

At block 413, the management plan(s) is initiated. Initiate of the management plan can take various forms. As examples, initiating a management plan may be generated migration requests for the high demand logical storage containers, isolating high demand logical storage containers, presenting a graphical depiction of demand factors for both aggregates and logical storage containers of those aggregates, and generating recommendations for actions to be taken.

The flowcharts are provided to aid in understanding the illustrations and are not to be used to limit scope of the claims. The flowcharts depict example operations that can vary among various embodiments. Additional operations may be performed; fewer operations may be performed; the operations may be performed in parallel; and the operations may be performed in a different order. For instance, operations represented by blocks 203, 205, and 207 may be performed in a more comprehensive manner. In other words, the data can be obtained for all of the specified aggregates instead of incrementally before computing the aggregate demand factors. Likewise, the data for logical storage containers can be obtained for groups (or all) of the logical storage containers before computing the logical storage container demand factors.

As will be appreciated by one skilled in the art, aspects of the disclosure may be implemented as a system, method or computer program product. Accordingly, aspects of the disclosure may take the form of a hardware embodiment, a software embodiment (including firmware, resident software, micro-code, etc.) or embodiments combining software and hardware that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc. Furthermore, aspects of the disclosure may take the form of a computer program product embodied in one or more computer readable medium(s) having computer readable program code embodied thereon.

Any combination of one or more machine/computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device, but does not include mediums that are computer readable signal mediums.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
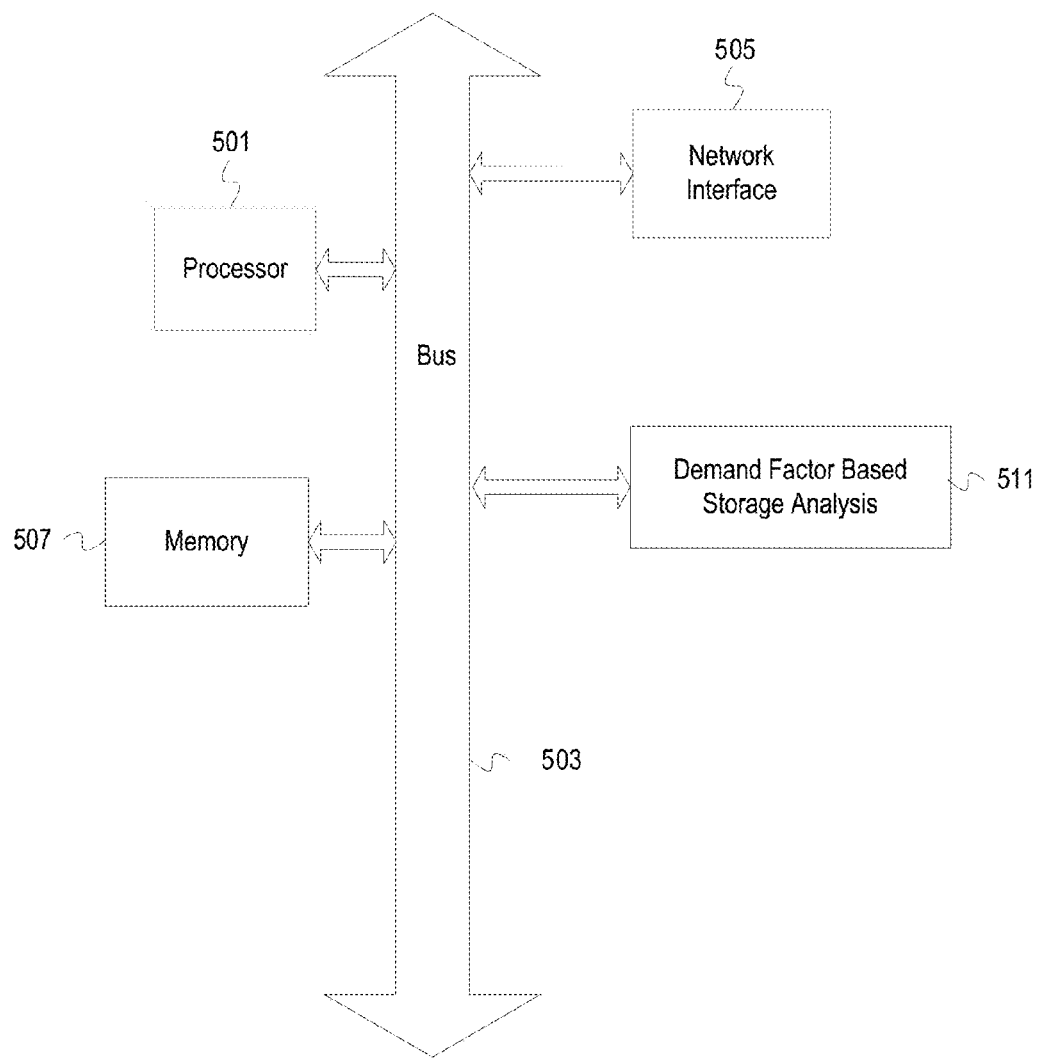
FIG. 5 depicts an example computer system with a demand factor based storage analysis component.

FIG. 5 depicts an example computer system with a demand factor based storage analysis component. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI bus, ISA bus, PCI-Express bus, HyperTransport® bus, InfiniBand® bus, NuBus, etc.) and a network interface 505 (e.g., an ATM interface, an Ethernet interface, a Frame Relay interface, SONET interface, wireless interface, etc.). The system also includes a demand factor based storage analysis component 511. The demand factor based storage analysis component 511 computes demand factors for aggregates and logical storage containers with data gathered about the aggregates and the logical storage containers as described above. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the demand factor based storage analysis component 511, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the claims is not limited to them. In general, techniques for computing demand factors that capture the relationship between used storage capacity and storage performance as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the example configurations may be implemented as a combined structure or component. Similarly, structures and functionality presented as a single component may be implemented as separate components. These and other variations, modifications, additions, and improvements may fall within the scope of the claims.

What is claimed is:

1. A method comprising:
obtaining data from a storage system by a processor executing instructions out of a memory about an aggregation of storage devices with respect to a specified time period, where the data includes performance data regarding the aggregation of storage devices and configuration data of the storage devices indicating storage device capability for determining input/output performance capability of the aggregation of storage devices; wherein the configuration data includes a number of storage devices in the aggregation and an amount of physical access mechanisms for the storage devices;

determining by the processor, with the obtained data about the aggregation of storage devices, a total amount of data transferred for the aggregation of storage devices over the specified time period, input/output performance capability of the aggregation of storage devices, and utilization of the storage devices for servicing requests by the aggregation of storage devices over the specified time period;

determining by the processor an aggregate demand value that represents demand on the aggregation of storage devices based on the obtained data, wherein said determining the aggregate demand value comprises determining a product of the utilization of the storage devices for servicing requests by the aggregation of storage devices over the specified time period and a quotient of the total amount of data transferred for the aggregation of storage devices over the specified time period and the input/output performance capability of the aggregation of storage devices that is based on the configuration data;

iteratively determining by the processor demand on logical storage containers of the aggregation of storage devices; wherein said determining demand on the logical storage containers of the aggregation of storage devices comprises determining demand on a first logical storage container of the logical storage containers, by determining a logical storage container demand value as a product of a latency value for the first logical storage container and a quotient of a throughput value for the first logical storage container and amount of storage space used by the first logical storage container at a storage device; and using by the processor the determined demand on the logical storage containers of the aggregation of storage devices to manage the aggregation of storage devices such that a high demand logical container is moved to a low demand aggregate of storage devices.

2. The method of claim 1, further comprising obtaining data about the logical storage containers of the aggregation of storage devices with respect to a specified time period, wherein the data about the logical storage containers indicates latency values for the logical storage containers, throughput values for the logical storage containers, and amounts of storage space used by each of the logical storage containers.

3. The method of claim 1, wherein the latency value indicates an average latency for servicing input/output requests that target the first logical storage container over the specified time period.

4. The method of claim 1, wherein said determining the input/output performance capability of the aggregation of storage devices comprises determining the input/output performance capability of the aggregation of storage devices based on input/output performance capability of each type of storage device in the aggregation of storage devices and number of each type of storage device in the aggregation of storage devices.

5. The method of claim 1, wherein said determining utilization of the storage devices for servicing requests by the aggregation of storage devices over the specified time period comprises determining an average amount of time the aggregation of storage devices spend servicing input/output requests within the time period.

6. The method of claim 1, wherein said using the determined demand on the logical storage containers of the aggregation of storage devices to manage the aggregation of storage devices comprises determining a plan to migrate at least some of the logical storage containers to a different aggregation of storage devices based on the determined logical container demand values.

7. One or more non-transitory machine-readable media comprising program code to:

obtain data from a storage system by a processor executing instructions out of a memory about an aggregation of storage devices with respect to a specified time period, where the data includes performance data regarding the aggregation of storage devices and configuration data of the storage devices indicating storage device capability for determining input/output performance capability of the aggregation of storage devices; wherein the configuration data includes a number of storage devices in the aggregation and an amount of physical access mechanisms for the storage devices;

determine by the processor, with the obtained data about the aggregation of storage devices, a total amount of data transferred for the aggregation of storage devices over the specified time period, input/output performance capability of the aggregation of storage devices, and utilization of the storage devices for servicing requests by the aggregation of storage devices over the specified time period;

determine by the processor an aggregate demand value that represents demand on the aggregation of storage devices based on the obtained data, wherein said determining the aggregate demand value comprises determining a product of the utilization of the storage devices for servicing requests by the aggregation of storage devices over the specified time period and a quotient of the total amount of data transferred for the aggregation of storage devices over the specified time period and the input/output performance capability of the aggregation of storage devices that is based on the configuration data;

iteratively determine by the processor demand on logical storage containers of the aggregation of storage devices; wherein the program code to determine demand on the logical storage containers of the aggregation of storage devices comprises program code to determine demand on a first logical storage container of the logical storage containers, wherein the program code to determine demand on the first logical storage container comprises program code to determine a logical storage container demand value as a product of a latency value for the first logical storage container and a quotient of a throughput value for the first logical storage container and an amount of storage space used by the first logical storage container; and use by the processor the determined demand on the logical storage containers of the aggregation of storage devices to manage the aggregation of storage devices such that a high demand logical container is moved to a low demand aggregate of storage devices.

8. The one or more non-transitory machine-readable storage media of claim 7 further comprising program code to obtain data about the logical storage containers of the aggregation of storage devices with respect to a specified time period, wherein the data about the logical storage containers indicates latency values for the logical storage containers, throughput values for the logical storage containers, and amounts of storage space used by each of the logical storage containers.

9. The one or more non-transitory machine-readable storage media of claim 7, wherein the latency value indicates an average latency for servicing input/output requests that target the first logical storage container over the specified time period.

10. The one or more non-transitory machine-readable storage media of claim 7, wherein the program code to determine the input/output performance capability of the aggregation of storage devices comprises the program code to determine the input/output performance capability of the aggregation of storage devices based on input/output performance capability of each type of storage device in the aggregation of storage devices and number of each type of storage device in the aggregation of storage devices.

11. The one or more non-transitory machine-readable storage media of claim 7, wherein the program code to determine utilization of the storage devices for servicing requests by the aggregation of storage devices over the specified time period comprises program code to compute an average amount of time the aggregation of storage devices spend servicing input/output requests within the time period.

12. The one or more non-transitory machine-readable storage media of claim 7, wherein the program code to use the determined demand on the logical storage containers of the aggregation of storage devices to manage the aggregation of storage devices comprises program code to determine a plan to migrate at least some of the logical storage containers to a different aggregation of storage devices based on the determined logical container demand values.

13. An apparatus comprising:
a processor; and
a machine-readable media having program code stored thereon, the program code executable by the processor to cause the apparatus to,
obtain data from a storage system by the processor about an aggregation of storage devices with respect to a specified time period, where the data includes performance data regarding the aggregation of storage devices and configuration data of the storage devices indicating storage device capability for determining input/output performance capability of the aggregation of storage devices; wherein the configuration data includes a number of storage devices in the aggregation and an amount of physical access mechanisms for the storage devices;
determine by the processor, with the obtained data about the aggregation of storage devices, a total amount of data transferred for the aggregation of storage devices over the specified time period, input/output performance capability of the aggregation of storage devices, and utilization of the storage devices for servicing requests by the aggregation of storage devices over the specified time period;
determine by the processor an aggregate demand value that represents demand on the aggregation of storage devices based on the obtained data, wherein said determining the aggregate demand value comprises determining a product of the utilization of the storage devices for servicing requests by the aggregation of storage devices over the specified time period and a quotient of the total amount of data transferred for the aggregation of storage devices over the specified time period and the input/output performance capability of the aggregation of storage devices that is based on the configuration data; and
determine by the processor demand on logical storage containers of the aggregation of storage devices; wherein the program code executable by the processor to cause the apparatus to determine demand on the logical storage containers of the aggregation of storage devices comprises program code executable by the processor to cause the apparatus to determine demand on a first logical storage container of the logical storage containers, and wherein the program code to determine demand on the first logical storage container comprises program code executable by the processor to cause the apparatus to determine a logical storage container demand value as a product of a latency value for the first logical storage container and a quotient of a throughput value for the first logical storage container and an amount of storage space used by the first logical storage container; and
use by the processor the determined demand on the logical storage containers of the aggregation of storage devices to manage the aggregation of storage devices such that a high demand logical container is moved to a low demand aggregate of storage devices.

14. The apparatus of claim 13, further comprising program code executable by the processor to cause the apparatus to obtain data about the logical storage containers of the aggregation of storage devices with respect to a specified time period, wherein the data about the logical storage containers indicates latency values for the logical storage containers, throughput values for the logical storage containers, and amounts of storage space used by each of the logical storage containers.

15. The apparatus of claim 13, wherein the latency value indicates an average latency for servicing input/output requests that target the first logical storage container over the specified time period.

16. The apparatus of claim 13, wherein the program code executable by the processor to cause the apparatus to determine the input/output performance capability of the aggregation of storage devices comprises the program code executable by the processor to cause the apparatus to determine the input/output performance capability of the aggregation of storage devices based on input/output performance capability of each type of storage device in the aggregation of storage devices and number of each type of storage device in the aggregation of storage devices.

17. The apparatus of claim 13, wherein the program code executable by the processor to cause the apparatus to determine utilization of the storage devices for servicing requests by the aggregation of storage devices over the specified time period comprises program code executable by the processor to cause the apparatus to compute an average amount of time the aggregation of storage devices spend servicing input/output requests within the time period.

18. The apparatus of claim 13, wherein the program code executable by the processor to cause the apparatus to use the determined demand on the logical storage containers of the aggregation of storage devices to manage the aggregation of storage devices comprises program code to determine a plan to migrate at least some of the logical storage containers to a different aggregation of storage devices based on the determined logical container demand values.

* * * * *